(12) United States Patent
Okunseinde et al.

(10) Patent No.: US 7,827,205 B2
(45) Date of Patent: Nov. 2, 2010

(54) BI-DIRECTIONAL DATA MAPPING TOOL

(75) Inventors: Folu Okunseinde, Austin, TX (US); Tyron Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 10/855,724

(22) Filed: May 27, 2004

(65) Prior Publication Data

US 2006/0004854 A1    Jan. 5, 2006

(51) Int. Cl.
*G06F 7/00* (2006.01)
*G06F 17/30* (2006.01)

(52) U.S. Cl. ...................................... 707/802; 707/809
(58) Field of Classification Search .................. None
See application file for complete search history.

(56) References Cited

U.S. PATENT DOCUMENTS

| | | | | |
|---|---|---|---|---|
| 5,627,979 | A * | 5/1997 | Chang et al. ................. | 715/763 |
| 6,038,393 | A * | 3/2000 | Iyengar et al. ............... | 717/104 |
| 6,122,641 | A | 9/2000 | Williamson et al. ......... | 707/103 |
| 6,240,186 | B1 | 5/2001 | Hyde et al. .................. | 380/255 |
| 6,324,576 | B1 * | 11/2001 | Newcombe et al. ......... | 709/223 |
| 6,442,554 | B1 * | 8/2002 | Reddy et al. ................. | 707/100 |
| 6,681,223 | B1 * | 1/2004 | Sundaresan .................... | 707/6 |
| 6,795,868 | B1 * | 9/2004 | Dingman et al. ............ | 709/246 |
| 6,820,135 | B1 * | 11/2004 | Dingman et al. ............ | 709/246 |
| 6,836,778 | B2 * | 12/2004 | Manikutty et al. .......... | 707/102 |
| 6,859,810 | B2 * | 2/2005 | Andrei et al. ................ | 707/102 |
| 7,010,539 | B1 * | 3/2006 | Haas et al. ................... | 707/101 |
| 7,103,613 | B2 * | 9/2006 | Nouri ...................... | 707/103 R |
| 7,158,997 | B2 * | 1/2007 | Blinn et al. ............... | 707/104.1 |
| 2001/0009554 | A1 | 7/2001 | Katseff et al. | |
| 2001/0056504 | A1 | 12/2001 | Kuznetsov | |
| 2002/0022974 | A1 * | 2/2002 | Lindh ............................ | 705/3 |
| 2002/0169842 | A1 | 11/2002 | Christensen et al. | |
| 2002/0184213 | A1 * | 12/2002 | Lau et al. ....................... | 707/6 |
| 2003/0014617 | A1 | 1/2003 | Tamboli et al. | |
| 2003/0025732 | A1 | 2/2003 | Prichard et al. | |
| 2003/0154191 | A1 * | 8/2003 | Fish et al. ...................... | 707/2 |
| 2003/0158854 | A1 | 8/2003 | Yoshida et al. | |
| 2003/0163585 | A1 | 8/2003 | Elderon et al. | |
| 2004/0064502 | A1 * | 4/2004 | Yellepeddy et al. ......... | 709/203 |
| 2004/0068526 | A1 * | 4/2004 | Singh .......................... | 707/203 |
| 2004/0093342 | A1 * | 5/2004 | Arbo et al. ................... | 707/102 |
| 2004/0139102 | A1 * | 7/2004 | Vierich et al. ............... | 707/102 |
| 2005/0021513 | A1 * | 1/2005 | Vedula et al. .................. | 707/3 |
| 2005/0027564 | A1 * | 2/2005 | Yantis ............................ | 705/2 |
| 2005/0033718 | A1 * | 2/2005 | Rettig et al. ................... | 707/1 |
| 2005/0050068 | A1 * | 3/2005 | Vaschillo et al. ............ | 707/100 |
| 2005/0065951 | A1 * | 3/2005 | Liston et al. ................ | 707/101 |
| 2005/0165817 | A1 * | 7/2005 | O'Conor ..................... | 707/101 |

(Continued)

OTHER PUBLICATIONS

N. Tong, "Database Schema Transformation Optimisation Techniques for the AutoMed System", In Proceedings of BNCOD20, Springer Verlag LNCS, vol. 2712, pp. 157-171, 2003.*

(Continued)

*Primary Examiner*—Jay A Morrison
(74) *Attorney, Agent, or Firm*—Stephen J. Walder, Jr.; David A. Mims, Jr.

(57) ABSTRACT

A computer implemented method is provided for a bi-directional data mapping tool. The method for mapping between at least two data models comprises selecting a source including a first data model, selecting a target including a second data model and defining a relationship between the data in the source and the data in the target. The method further comprises generating a bi-directional map from at least portions of the source, the target, and the defined relationship.

27 Claims, 5 Drawing Sheets

OTHER PUBLICATIONS

N. Rizopoulos, "Automatic discovery of semantic relationships between schema elements", 6th International Conference on Enterprise Information Systems (ICEIS 2004), Universidade Portucalense, Porto—Portugal, Apr. 14-17, 2004.*

N. Rizopoulos, "Discovery of Semantic Relationships between Schema Elements", AutoMed Technical Report, Version 1, Monday Aug. 18, 2003.*

U.S. Appl. No. 60/479,603, filed Jun. 18, 2003.*

* cited by examiner

BI-DIRECTIONAL DATA MAPPING TOOL

BACKGROUND OF THE INVENTION

1. Field of the Invention

This invention relates generally to managing electronic data, and, more particularly, to bi-directionally mapping between at least two data models.

2. Description of the Related Art

As information technology has matured, computing systems have evolved into what are now known as "enterprise computing systems." An enterprise computing system is typically a large number of computing and storage devices that are employed by users from a single concern, or "enterprise." One popular type of enterprise computing system is an "intranet," which is a computing system that operates like the Internet, but requires special authorization to access. Such access is typically only granted to employees and/or contractors of the enterprise. However, not all enterprise computing systems are intranets or operate along the principles of the Internet.

One desirable characteristic of enterprise computing systems is relatively large repositories of information that are readily accessible. Members of the enterprise can access the same information from widely diverse locations and the enterprise computing system may need only to keep one copy of that information. The single copy, or limited numbers of copies, greatly simplifies information management. For instance, if one user accesses, uses, and changes the information, the information manager does not need to propagate those changes across multiple copies of the information. The single copy also facilitates maintenance of information coherency by taking precautions for multiple users of a single copy instead of multiple users of multiple copies.

Enterprise computing systems suffer limitations and disadvantages because they typically evolve over time in a patchwork fashion. Sometimes the development is prompted by changes in technology. For instance, a new computing technology may impart a new capability particularly useful in a part of an organization's operation. Thus, that part of the organization may acquire that particular technology, whereas some other part of the organization may not. Other times, the development may be prompted by changes in the organization's structure. For example, a corporation may acquire another company, or a part of another company. The acquisition will frequently include the computing resources, which may then need to be integrated into the acquiring organization's computing system. These computing resources may be vastly different from those of the existing enterprise computing system.

Maintaining the coherency of the enterprise computing system is one facet of "business integration." To leverage the advantages of the enterprise computing system, the structure and capabilities should be transparent to the user. Additionally, data should be compatible with applications. However, the scale of an enterprise computing system makes it difficult to operate transparently in this fashion, but information managers continually strive to achieve this goal. Furthermore, this goal is not limited to enterprise computing systems, but to computing systems of all scales and complexities.

One problem in this respect is the proliferation of data models. For example, one enterprise system may store customer data in XML ("Extensible Markup Language") format and store the customer name as one single, large field. Another enterprise system may store customer information in EDI ("Electronic Data Interchange") format and separate the customer's first, middle, and last names into separate fields. The format (e.g., XML, EDI) and structure (one field, multiple fields) define the data models in this example. Note that XML and EDI are two examples among many formats in which data can be formatted. Should one enterprise system merge with the other, it would be desirable for the various computing resources to successfully access the various customer data regardless of the data model.

One approach is to manually code a "map" between the two different data formats. This map would delineate between style and content of the data in the two formats and correlate the content of the fields. Thus, a user or application expecting to receive data in a first format (e.g., XML) can employ the map to read the data in a second format (e.g., EDI). However, manual coding can be labor intensive and undesirably expensive. It is also difficult to understand the relationship between the two coding techniques.

The industry has consequently searched for alternative solutions. For instance, a standards setting group called World Wide Web Consortium (or, "W3C") developed the XSL ("Extensible Style Language") specification for separating style from content when creating HTML ("Hyper Text Markup Language") or XML pages. The specification works like a template, allowing designers to apply single style documents to multiple pages giving the ability to transform multiple instances of a document type in a formalized manner. A variety of mapping tools employ XSL to transform a version of an XML document into another version of an XML document. Examples include the Microsoft® BizTalk Editor™, WBI Object Mapping Utility, and WSAD SML mapping tools.

However, these solutions map in only one direction (e.g., EDI to XML, but not XML to EDI) and are, therefore, not suitable for business integration. To access data in either direction, multiple maps must be created and accessed, which traditionally has been very tedious and difficult to implement because a customized map may have to be defined directly in code, such as straight XSL. In the effort to integrate, for example, an enterprise computing system, these maps and their use can constitute significant overhead to the operation of the computing system. This overhead could be reduced by a reduction in the number of maps.

The present invention is directed to addressing the effects of, one or more of the problems set forth above.

SUMMARY OF THE INVENTION

In one aspect of the present invention, a method is provided for a bi-directional data mapping tool. The method for mapping between at least two data models includes selecting a source including a first data model, selecting a target including a second data model, and defining a relationship between the data in the source and the data in the target. The method further includes generating a bi-directional map from at least portions of the source, the target, and the defined relationship. The mapping method can be used in the course of converting data or in integrating a computing system so that applications can read data stored in a variety of data formats and structures.

BRIEF DESCRIPTION OF THE DRAWINGS

The invention may be understood by reference to the following description taken in conjunction with the accompanying drawings, in which like reference numerals identify like elements, and in which.

Figure 1:
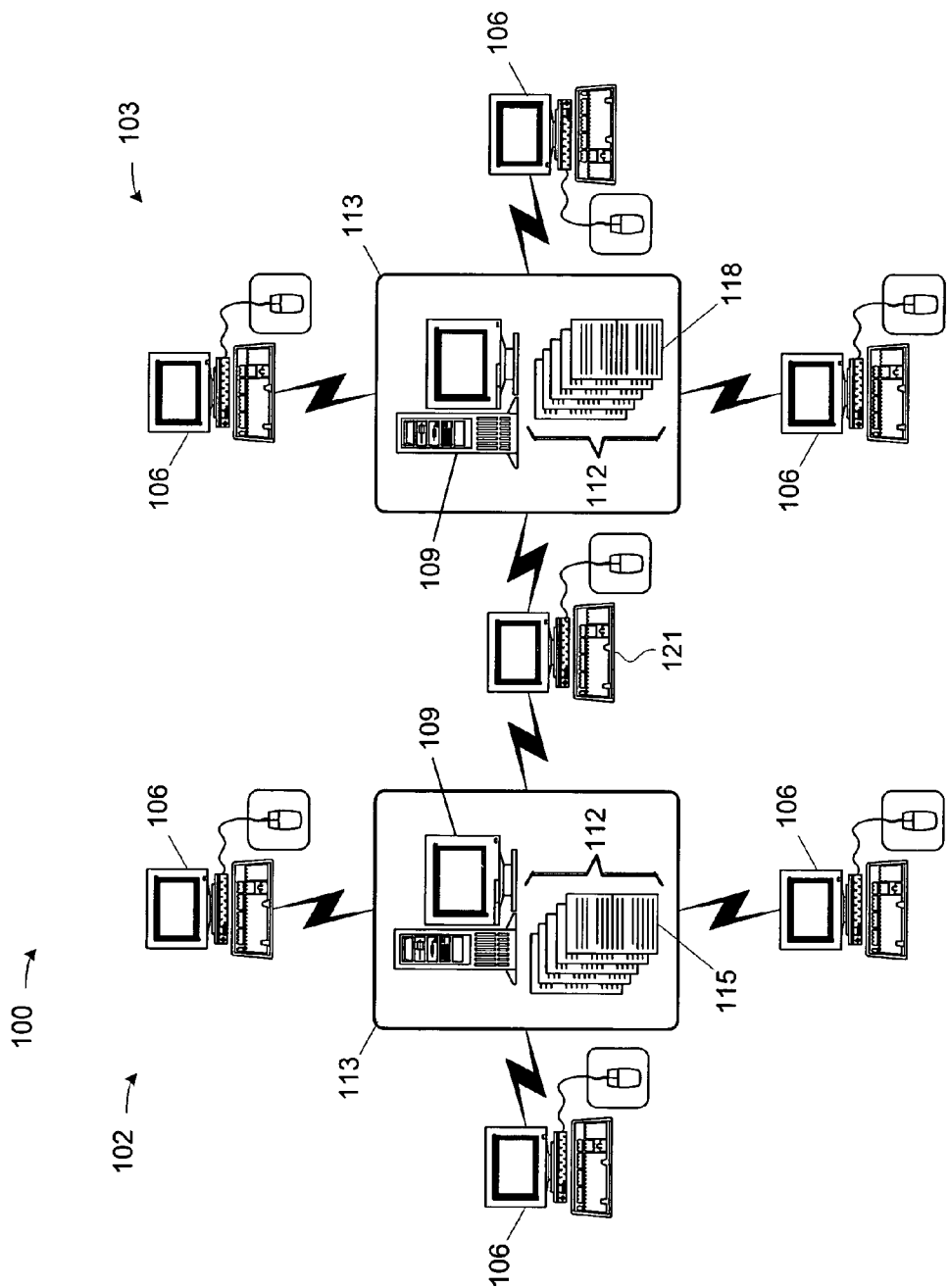
FIG. 1 conceptually depicts two computing systems across which the present invention may be used to generate a bi-directional map for data models in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 illustrates a computing system 100 including two smaller computing systems 102, 103 across which the present invention may be used to generate a bi-directional map for data models in accordance with the present invention. Each computing system 102, 103 includes a plurality of computing devices, e.g., the workstations 106 and the servers 109. Note that the number and composition of the computing devices that constitute the computing systems 102, 103 is not material to the practice of the invention. One or both of the computing systems 102, 103 will typically include, for instance, peripheral devices such as printers, though none are shown, and may include other types of computers, such as desktop personal computers. In the illustrated embodiment, the computing systems 102, 103 are enterprise computing systems, and so will typically include a large number of computing devices.

The computing systems 102, 103 are, in the illustrated embodiment, networks, i.e., a group of two or more computer systems linked together. Networks can be categorized by the scope of the geographical area of their constituent computing devices:

local-area networks ("LANs"), in which the computing devices are located in relatively close proximity (e.g., in the same building);

wide-area networks ("WANs"), in which the computing devices are farther apart than in a LAN and are remotely connected by landlines or radio waves;

campus-area networks ("CANs"), in which the computing devices are within a limited geographic area, such as a university or research campus or a military base;

metropolitan-area networks ("MANs"), in which the computers are distributed throughout a municipality or some within some reasonable proximity thereto; and home-area networks ("HANs"), in which the computing devices are located within a user's home and connects a person's digital devices.

Note that these categorizations are not particularly distinct, and memberships may overlap. For instance, a HAN may be a LAN and a CAN may be a WAN.

Other, less common categorizations are also sometimes used. Networks can be categorized by their functionality, as well. For instance, functionality categorizations include:

content delivery networks ("CDNs"), or networks of servers that deliver a Web page to a user based on geographic locations of the user, the origin of the Web page and a content delivery server; and storage area networks ("SANs"), or high-speed subnetworks of shared storage devices available various servers on, for example, a LAN or a WAN to free servers from data storage responsibilities.

Networks can also be categorized by characterizations drawn from their implementation other than their physical scope. For instance, networks can be categorized by their:

topology, or the geometric arrangement of a computer system, (e.g., a bus topology, a star topology, or a ring topology);

protocol, or the common set of rules specifications that define the types, numbers, and forms for signals used to communicate among the computing devices (e.g., Ethernet or the IBM token-ring protocols); and architecture, or the structure of communications among the computing devices (e.g., a peer-to-peer architecture or a client/server architecture).

Still other physical characteristics may be employed.

As an enterprise computing system, the computing systems 102, 103 may include many sub-networks falling into one or more of the network categorizations set forth above. For instance, an enterprise computing system may include several CANs, each of which include several WANs that interface with HANs through which employees or contractors work. The WANs may include SANs and CDNs from and through which the user extracts information. Some of the WANs may have peer-to-peer architectures while others may have client/server architectures. The computing systems 102, 103, in the illustrated embodiment, may be expected to exhibit one or more of these characteristics described above.

Note, however, that the present invention is not limited to application in enterprise computing systems, or even in networks. The invention may be employed to bi-directionally map between data models exhibited by documents residing on a single machine. For instance, a user might want to develop a number of bi-directional maps in accordance with the invention on a standalone computer and then port them to a larger computing system in which they may actually be employed. Thus, the invention admits wide latitude in the implementation of various alternative embodiments with respect to the environment in which the invention is employed.

Returning to FIG. 1, each server 109 has a plurality of documents 112 residing thereon, and therefore constitutes a data repository 113. The documents 112 are schema-based files, i.e., any text-based file having a defined structure. At least two of the documents 112, e.g., the documents 115, 118 incorporate different data models. In the illustrated embodiment, the documents 115, 118 reside on different computing devices in different computing systems, i.e., the servers 109 of the computing systems 102, 103, respectively. However, the invention is not so limited. As was noted above, the invention may be employed in some embodiments on a single computing device. In these embodiments, the documents 115, 118 may reside on the same computing device. Thus, the situs of the documents 115, 118 is not material to the practice of the invention.

The illustrated embodiment also includes a single computing device 121 communicating with both the computing systems 102, 103. In some embodiments, the computing device 121 may include a portion of one of the computing systems 102, 103, or may stand alone. If the computing device 121 stands alone, then the documents 115, 118 should reside on the computing device 121 or on removable storage accessible by the computing device 121. Furthermore, the functionality associated with the computing device 121, as described below, may be distributed across a computing system instead of centralized in a single computing device. The computing device 121 is implemented in the illustrated embodiment as a workstation, but may be some other type of computing device, e.g., a desktop personal computer.

Figure 2:
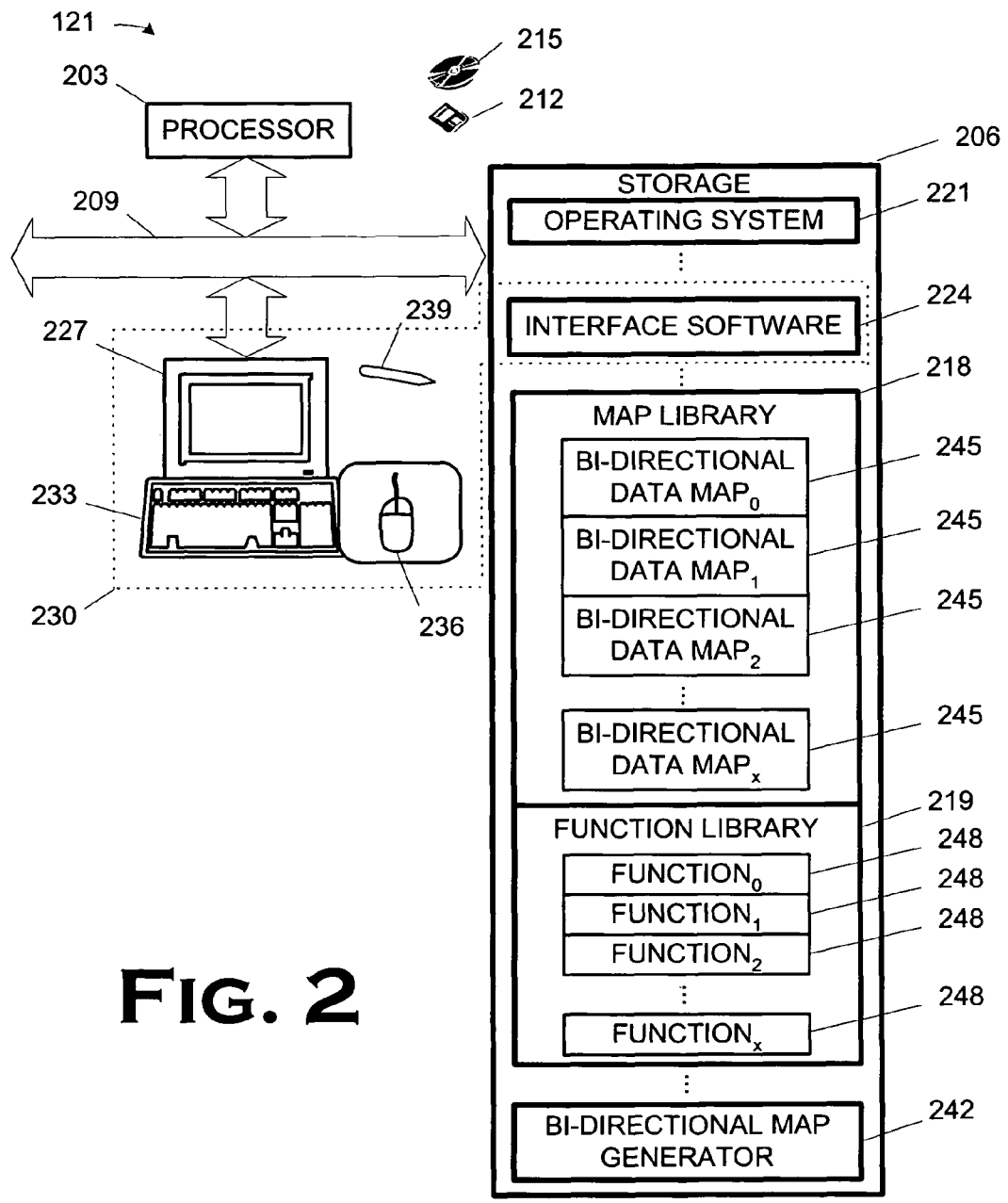
FIG. 2 depicts, in a block diagram, selected portions of a computing device with which certain aspects of the present invention may be implemented.

FIG. 2 depicts, in a block diagram, selected portions of the computing device 121, including a processor 203 communicating with some storage 206 over a bus system 209. The processor 203 may be any suitable kind of processor known to the art, e.g., a digital signal processor ("DSP"), a graphics processor, or a general purpose microprocessor. In some embodiments, the processor 203 may be implemented as a processor set, such as a microprocessor with a graphics or math co-processor. The storage 206 may be implemented in conventional fashion and may include a variety of types of storage, such as a hard disk and/or RAM and/or removable storage such as the magnetic disk 212 and the optical disk 215. The storage 206 will typically include both read-only and writable memory, implemented in disk storage and/or cache. Parts of the storage 206 will typically be implemented in magnetic media (e.g., magnetic tape or magnetic disk) while other parts may be implemented in optical media (e.g., optical disk). The present invention admits wide latitude in implementation of the storage 206 in various embodiments. The bus system 209 may operate in accordance with any suitable protocol known to the art.

The storage 206 is encoded with one or more data structures used as a map library 218 and a function library 219 employed in the present invention as discussed more fully below. The storage 206 is also encoded with an operating system 221 and some interface software 224 that, in conjunction with the display 227, constitute an user interface 230. The display 227 may be a touch screen allowing the user to input directly into the computing device 121. However, the user interface 230 also may include peripheral input/output ("I/O") devices such as the keyboard 233, the mouse 236, or the stylus 239. The processor 203 runs under the control of the operating system 221, which may be practically any operating system known to the art. The processor 203, under the control of the operating system 221, invokes the interface software 224 on startup so that the user (not shown) can control the computing device 121. In the illustrated embodiment, the user interface 230 includes a graphical user interface ("GUI"), although other types of interfaces may be used.

A bi-directional map generator 242 resides in the storage 206 in accordance with the present invention. The bi-directional map generator 242 is invoked by the processor 203 under the control of the operating system 221 or by the user through the user interface 230. The bi-directional map generator 242 generates and populates the map library 218 with the bi-directional maps 245 generated in accordance with the present invention as described more fully below. In the illustrated embodiment, the bi-directional map generator 242 also generates and populates a function library 219 with a plurality of functions 248, also as described more fully below. Note, however, that not all embodiments will employ functions 248 or more than one bi-directional map 245.

As mentioned above, the functionality associated with the computing device 121 may be distributed across a computing system instead of centralized in a single computing device. Thus, alternative embodiments may, for instance, distribute the bi-directional map generator 242, the map library 218, and the function library 219 across, for example, one or both of the computing systems 102, 103 (shown in FIG. 1). Some embodiments may even omit the function library 219 altogether. However, the illustrated embodiment centralizes these components on a single computing device 121 to clarify the illustration and thereby facilitate the disclosure of the present invention.

Figure 3:
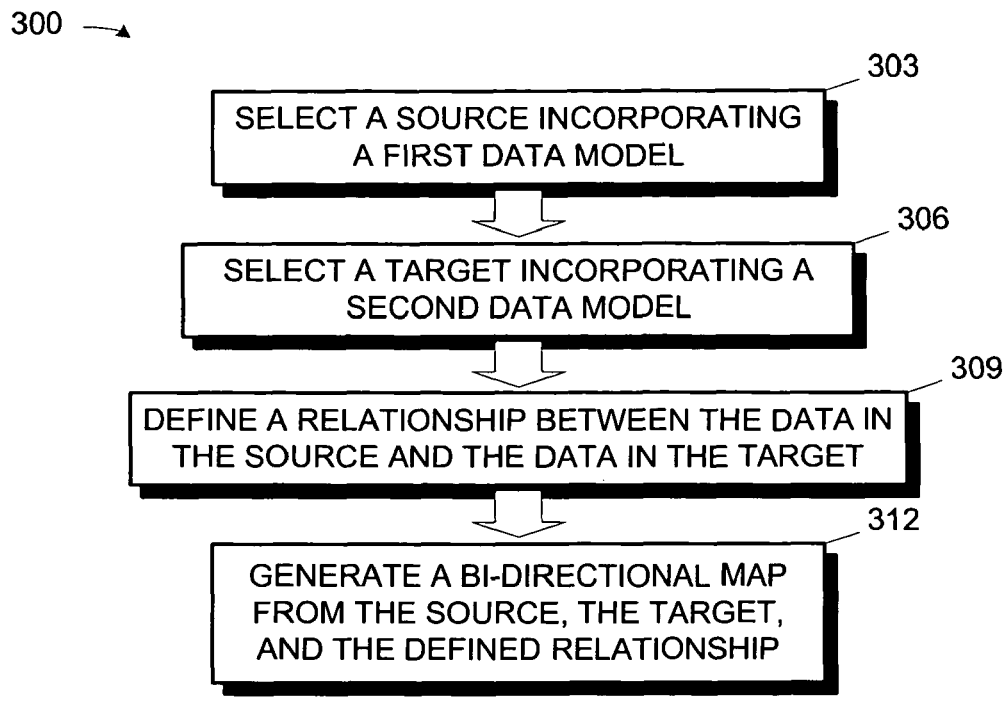
FIG. 3 illustrates one embodiment of a method for bi-directionally mapping between two data models in accordance with the present invention.
Figure 4:
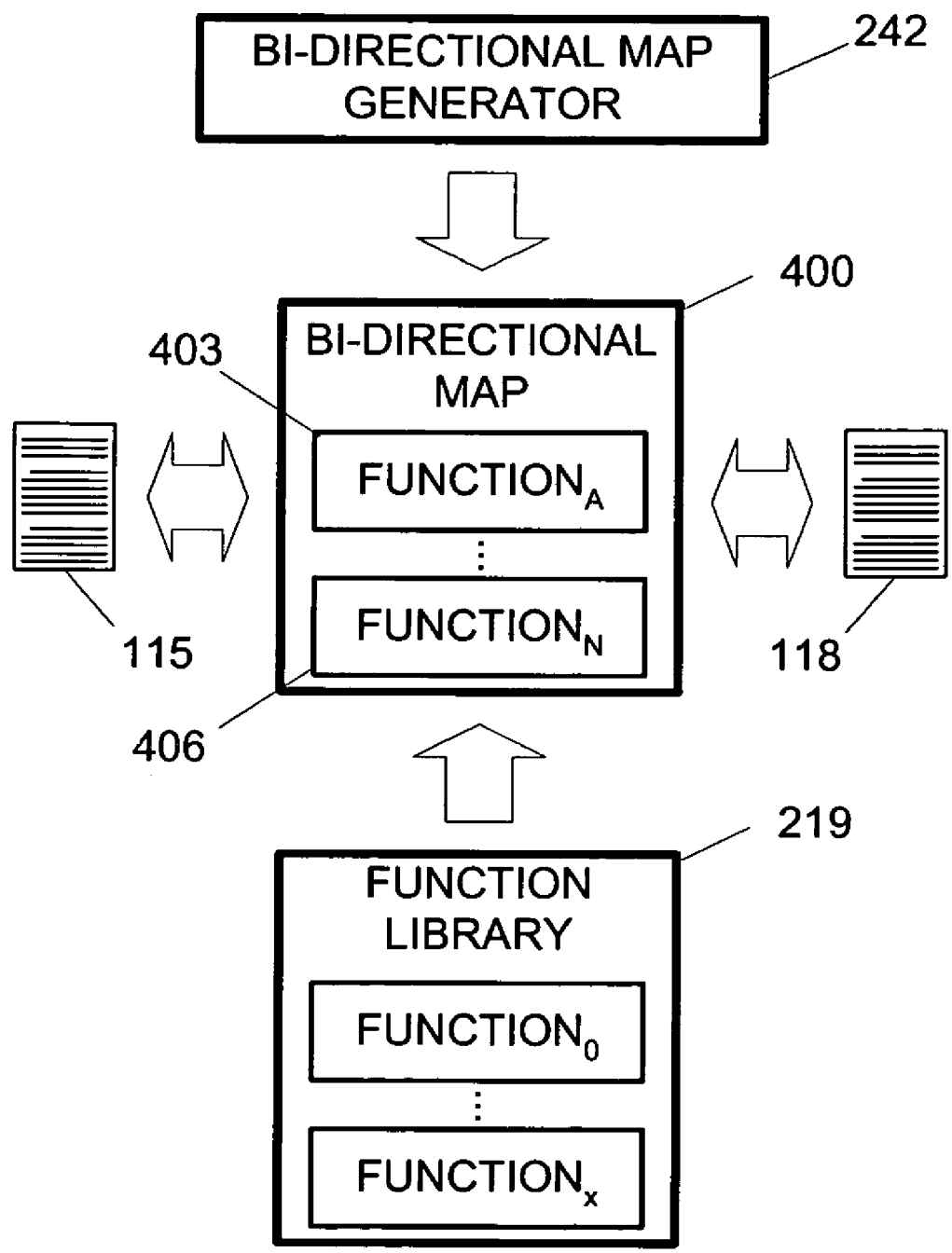
FIG. 4 conceptually illustrates one particular implementation of the method of FIG. 3 by the apparatus of FIG. 2.
Figure 5:
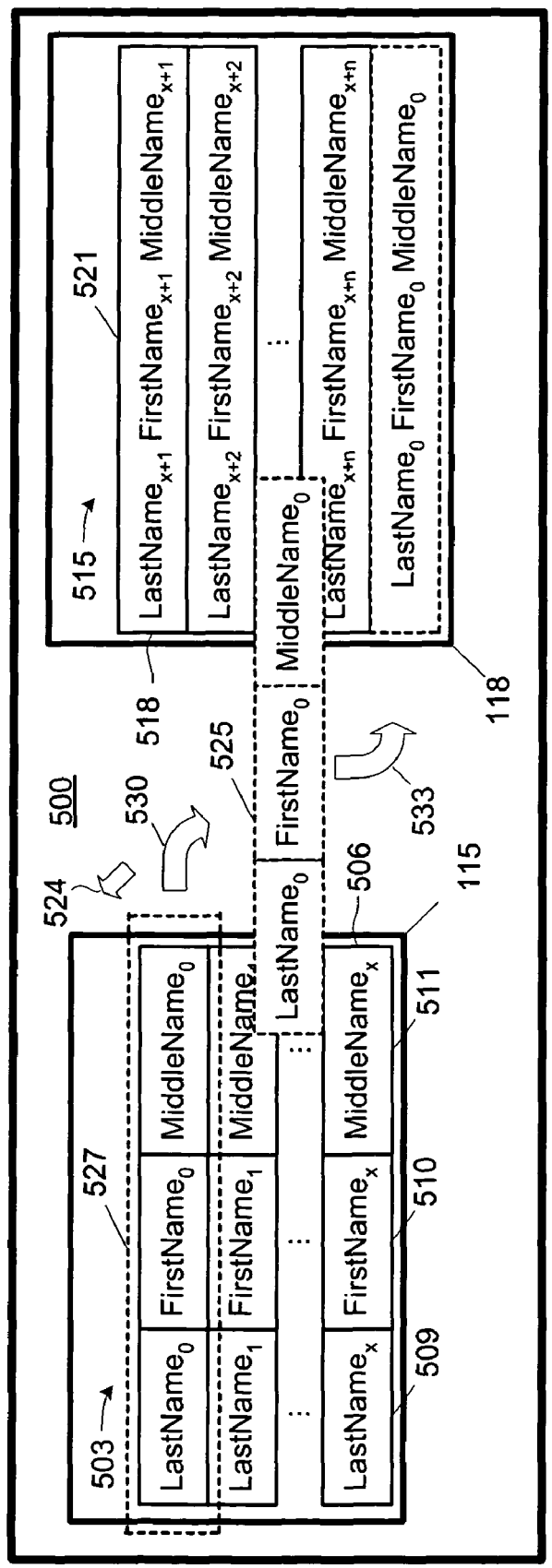
FIG. 5 depicts the definition of a mapping relationship between two data models using a graphical user interface in accordance with one particular embodiment.

As illustrated in FIG. 3, a user can invoke the bi-directional map generator 242 to map (at 300) between data models and to generate one or more bi-directional maps 245. The method begins by selecting (at 303) a source including a first data model and selecting (at 306) a target including a second data model. Referring now to FIG. 4, the source and target in the illustrated embodiment are the documents 115, 118, respectively. FIG. 5 illustrates the structure and content of the documents 115, 118 in this particular embodiment as they might be displayed on a screen 500 of the monitor 227 (shown in FIG. 2) in a GUI. For the sake of illustration, we will assume that the document 115 is in XML and contains a list 503 of customer names, each entry 506 (only one indicated) divided into three fields 509-511 (only one of each indicated) for the last, first, and middle names of the customers. Furthermore, we will assume the document 118 is in EDI and contains a list 515 of customer names, each entry 518 (only one indicated) including a single field 521 (only one indicated) for the first, second, and third names. Note, however, that the source and target may incorporate practically any data model know to the art.

The selections (at 303, 306) may be performed in any suitable manner known to the art, and will be implementation specific. For instance, some embodiments employing a GUI can graphically display a file structure from which a user can click on an icon representing the source and target to select them. Alternatively, the user may be permitted to type in the pathnames for the source and target in a Disk Operating System ("DOS") command line, or in a Common Gateway Interface ("CGI") box of a browser application. Or, the user may be able to select the source and target from a drop-down or pull-down list for an entry in a Wizard menu. Thus, at least to some degree, the implementation of the selection (at 303, 306) will depend on the implementation of the user interface 230, shown in FIG. 2.

Note that, in the illustrated embodiment, the target is a document, i.e., the document 118, already containing data, e.g., the list 515. Where both the source and target are documents, the format of the data models for the source and target will be reflected in the extensions of the file names of the source and target documents. Thus, selecting (at 303, 306, in FIG. 3) the source and target also informs the bi-directional map generator 242, shown in FIG. 2, of the involved data models. In turn, the selections (at 303, 306) also define the relationship between the data models of the source and target.

Where the format of one or more of the data models is/are not apparent from the names of the files, the user can directly specify those for the bi-directional map generator 242. The user may make this specification during the selection process or may be prompted (e.g., by the bi-directional map generator 242) for the specification. These interactions may be made by entering the information in a DOS command line, entering the information in a box of a browser application, or selecting the formats from a drop-down or pull-down list for an entry in a Wizard menu.

However, the selected target need not necessarily be a document in all embodiments. In some embodiments, the user may select only a target format (e.g., EDI) or an empty target document with a particular format. Note that, in these alternative embodiments, the target format is specified by the user to define the relationship between the two formats of the respective data models. These embodiments may default the structure of data in the target to some predetermined structure, e.g., the structure of the source document or some structure particularly suited to the given format. These embodiments may alternatively ask the user to construct fields for the target and, if the user declines to do so, default to some predefined structure. These embodiments may also then include libraries (not shown) of default structures for selected, commonly encountered data formats.

The user then defines (at 309) a relationship between the data in the source 115 and the data in the target 118. In the illustrated embodiment, this definition is performed on an intermediate representation of the data in the source 115 and the target 118. That is, this particular step is performed on the data in the source 115 and target 118 after the formatting has been stripped from the content of the source 115 and target 118. In the embodiment illustrated in FIG. 5, the user employs the mouse 236, shown in FIG. 2, to move the cursor 524 to select a data element 525, as indicated by the dotted lines 527. In this particular occurrence, the user has selected all three fields 509-511 of the first entry 506 in the list 503. The user then clicks and drags the data element 525, as indicated by the arrows 530, 533 to the target, i.e., the document 118, whereupon the user releases the data element 525 to drop it into the target, as indicated by the dotted lines in the list 521.

More technically, when the source 115 and the target 118 are selected (at 303, 306), the bi-directional map generator 242 assigns a variable to each data element therein. In the illustrated embodiment, for instance, each field 509-511 of the first entry 506 in the list 503 of the source 115 may be assigned a variable $x_1$-$x_3$, respectively, and the first entry 518 in the list 515 of the target 118 may be assigned a variable $y_1$. When the user selects the data element 525, the bi-directional map generator 242 recognizes that the user has selected $x_1$-$x_3$ in the source 115. When the user drags the data element 525 to the target 118 to create a new entry 518 in the list 515, the bi-directional map generator 242 recognizes that the three fields $x_1$-$x_3$ are being concatenated into a single entry 518. The recognition may be had by, for example, comparing the data element 525 to the entry 518 to recognize that the data element 525 includes three sets of text without spaces to a single set of text comprising three subsets of text separated by spaces.

The bi-directional map generator 242 then defines (at 309) that relationship between the data in the source 115 and target 118 in both directions. From the source 115 to the target 118, the relationship is a concatenation of the three fields 509-511 into a single entry 518, each field 509-511 separated after the concatenation by a "delimiter," i.e., a space. The delimiter may be user selected or a default coded into the bi-directional map generator 242. The delimiter need not necessarily be a space, but may be, for instance, some other character (such as a comma) or combination of characters (a comma and a space). From the target 118 to the source 115, the relationship is defined as the single entry 518 parsed at the delimiters into the three fields 509-511. Note that one is but the mirror image of the other, and so defining the steps for performing the mapping in the first direction also defines the steps for performing the mapping in the second direction. Thus, defining the relationship in the first direction can yield the relationship in the reverse direction.

Thus, the user has defined the relationship of the structure between the source and target, i.e., the three fields of each entry in the structure of the first data model are concatenated into a single field as an entry in the structure of the second data model. The converse is also true, wherein the single field of each entry in the structure of the second data model is parsed into three fields for an entry in the structure of the first data model. However, alternative embodiments may use alternative approaches such as typing in the information in a Disk Operating System ("DOS") command line using some structured syntax; typing in the information in a Common Gateway Interface ("CGI") box of a browser application using some structured syntax; or, selecting from among options presented in a drop-down or pull-down list for an entry in a Wizard menu.

The bi-directional map generator 242 then generates (at 312) a bi-directional map 400, shown in FIG. 4, from the source, the target, and the defined relationship. In the embodiment of FIG. 5, the bi-directional map generator 242 is cognizant of the structure of both the list 503 (multiple entries of three fields) in the source document 115 and the list 521 (multiple, single-field entries) in the target document 118 and the formats of the source and the target. The bi-directional map generator 242 interpolates the relationship between the two structures of the two data models. The interpolation draws from the data element 525's structure in the list 503 and the list 521. Note that this interpolation is bi-directional, i.e., in one direction, the data element 525 concatenates three fields into one and in the other direction one field is parsed into three. The interpolation is then formulated and encoded into the bi-directional map 400. In essence, you write out the constructs that you've defined with the tool in the necessary language. In XSLT for example, you create an .xsl document that embodies the functions, variables and logic as described above. The bi-directional map 400 may be coded in any suitable language, such as XSL or Java.

Note that functionality for mapping between the two models can be coded directly into the bi-directional map 400. However, the illustrated embodiment incorporates "functions" into the bi-directional maps 400 that may be invoked to perform the mapping. The functions are relatively simple, and are useful for commonly performed tasks such as iterating through recurring elements (or lists) and taking substrings of the data. For example, pseudo code:

```
<listA>
    <itemZ/>
    <itemY/>
    <itemX/>
</listA>
```

-continued

```
            goes to
              <listB>
                  <Z/>
                  <Y/>
                  <X/>
              </listB>
```

Each function is, in the illustrated embodiment, identified by a user-supplied name and includes a definition of its operation on the source element and the result in the target element.

For instance, in the illustrated embodiment, the user may define a function CONCATENATE to concatenate multiple data elements (i.e., the three fields 509-511) into a single element (i.e., a single field 521) with a delimiter, a space in this case. The user may also define a function PARSE to parse a single element (i.e., a single field 521) into multiple data elements (i.e., three fields 509-511) using the delimiter. The functions may be uni-directional, as in the case of the CONCATENATE and PARSE functions, or bi-directional. Thus, in the illustrated embodiment, the functions 403, 406 may be functions such as the CONCATENATE and PARSE functions described above. Furthermore, the functions CONCATENATE and PARSE could be invoked iteratively to map, for example, the list 503 into the list 521 on a row-by-row basis. However, other functions may be employed to, for example, transform data between numeric and ordinal forms or to convert data for time differences across time zones, or to convert data between date formats (i.e., mo/day/yr, and day/mo/year).

Thus, in the illustrated embodiment, the bi-directional map 400, coded in XSL and employing functions like CONCATENATE and PARSE might look something like:

Note, however, that this embodiment of the bi-directional map 400 is exemplary only.

The bi-directional map 400 can also include capabilities for dealing with contingencies such as non-uniform data. In the illustrated example, for instance, consider a scenario in which one of the fields 509-511 of the first entry 506 in the list 503 of the source 115 is empty, e.g., only one given name for a customer. One solution to this contingency results in two delimiters in the target document with no data in between, i.e., "lastname,firstname" instead of "lastname, firstname, middlename". Alternatively, logic could also be built into the bi-directional map 400 that assumes with only one delimiter and three targets, that the middle target is being skipped.

The illustrated embodiment also stores functions, once defined, in a function library 219, first shown in FIG. 2 and shown again in FIG. 4. Thus, if the desired function has already been defined, the user can select the previously defined function for inclusion in the bi-directional map 400. In this scenario, if the functions CONCATENATE and PARSE have previously been defined, the user can omit the step of actually defining them and specify their inclusion.

Figure 6:
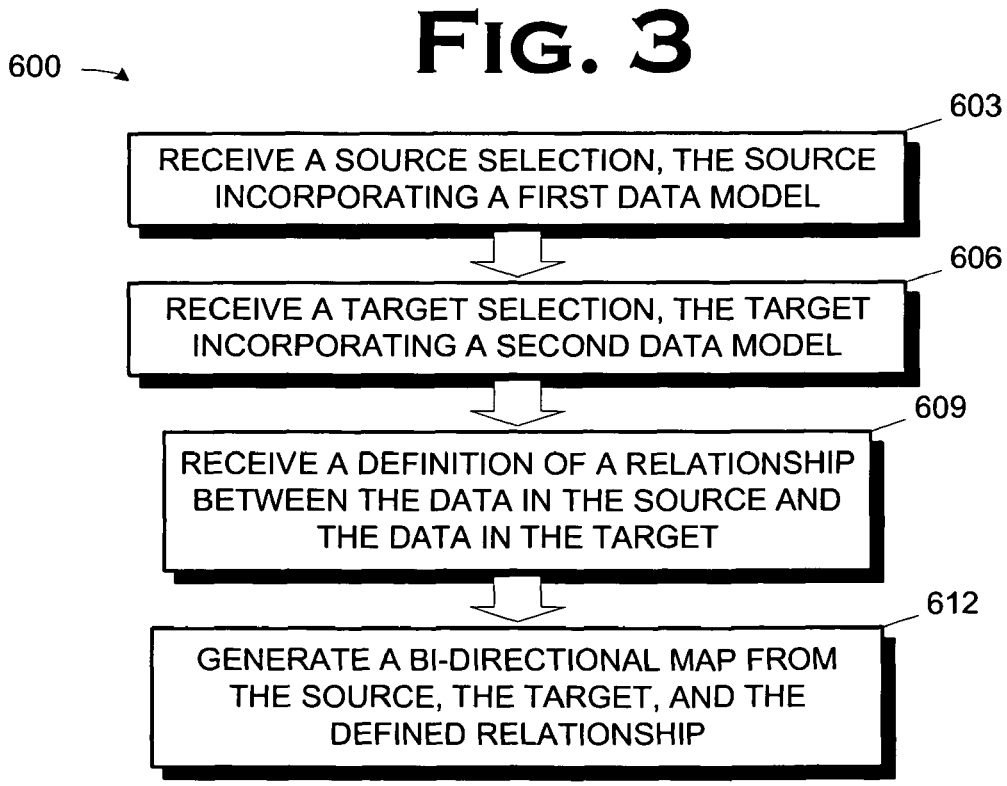
FIG. 6 illustrates another embodiment of a method for bi-directionally mapping between two data models in accordance with the present invention.

Thus, as shown in FIG. 6, the bi-directional map generator 242, first shown in FIG. 2, maps (at 600) between two data models, by:

receiving (at 603) a source selection, the source including a first data model;

receiving (at 606) a target selection, the target including a second data model;

receiving (at 609) a definition of a relationship between the data in the source and the data in the target; and generating (at 612) a bi-directional map from the source, the target, and the defined relationship.

```
<?xml version="1.0" encoding="UTF-8"?>
<xsl:stylesheet xmlns:xsl="http://www.w3.org/1999/XSL/Transform" version="1.0"
     xmlns:xalan="http://xml.client.org/xslt">
 <xsl:output method="xml" encoding="UTF-8" omit-xml-declaration="yes" indent="yes" />
 <xsl:template name="forward">
 <!--
  break up the name using spaces (' ')
  -->
  <xsl:variable name="fn" select="Attribute[@name='FullName']" />
  <xsl:variable name="ml" select="substring-after($fn, ' ')" />
 <FirstName>
  <xsl:value-of select="substring-before($fn, ' ')" />
 </FirstName>
 <MiddleName>
  <xsl:value-of select="substring-before($ml, ' ')" />
 </MiddleName>
 <LastName>
  <xsl:value-of select="substring-after($ml, ' ')" />
 </LastName>
 </xsl:template>
 <xsl:template name="reverse">
  <xsl:variable name="fname" select="FirstName" />
  <xsl:variable name="mname" select="MiddleName" />
  <xsl:variable name="lname" select="LastName" />
 <Attribute name="FullName" type="String">
  <xsl:value-of select="concat($fname,' ', $mname, ' ',$lname)" />
 </Attribute>
 </xsl:template>
</xsl:stylesheet>
```

Each of these steps may include variations in alternative embodiments as is described above.

Returning to FIG. 3, in summary, the user of the illustrated embodiment selects (at 303, 306) a source document 115 including a first data model and a target document 118 including a second data model. The user then defines (at 309) a relationship between the data in the source document 115 and the data in the target document 118. The user then chooses to (1) copy a data element 525, or (2) invoke a function, such as one of the functions 403, 406. If the user chooses to copy the data element, he/she drags the element from the visual representation of the source document 115 to the target document 118 field 521 and the mapping is entered into the system. If the user chooses to use a function, the function is defined or selected from the function library 219 and the target elements 521 are chosen and mapped. For each mapping, the user specifies whether the mapping is bi- or uni-directional. Following the mapping definition for structure, the user specifies the mapping method (e.g., XSL or Java) and the mapping component is generated (at 312) in both directions. No specification for the return mapping is needed, although the user is free to customize the reverse mapping if desired. If no target document 118 is specified, i.e. the user specifies a target format, the user defines the target element being mapped to for each operation.

The present invention admits wide variation in the application of the method illustrated in FIG. 3. For instance, the computing apparatus 121 can be configured to stand alone, and the method 300 employed to populate the map library 218 and, where used, the function library 219 so that they can be ported to another computing system. Alternatively, the method 300 may be employed to map data, e.g., to convert the content of a data store from one format to a second format. Or, as in the alternative embodiment, the method 300 may be employed for business integration across a computing system, such as the computing system 100 in FIG. 1.

A user first develops the map library 218, shown in FIG. 2, by generating a plurality of bi-directional data maps 245, each map 245 mapping bi-directionally from a first data model to a second data model, and storing the generated bi-directional data maps 245. The bi-directional maps 245 are generated in the manner described above and illustrated in FIG. 6—namely, by:
- receiving (at 603) a source selection, the source including a first data model;
- receiving (at 606) a target selection, the target including a second data model;
- receiving (at 609) a definition of a relationship between the data in the source and the data in the target; and
- generating (at 612) a bi-directional map from the source, the target, and the defined relationship.

Note that, in the illustrated embodiment, the user defines a plurality of functions 248 that populate the function library 219 as described above in the course of populating the map library 218. In some alternative embodiments, the map library 218 and the function library 219 populated in this manner are then ported to a computing system for use. However, in the illustrated embodiment, the computing device 121 is networked to the computing system 100, and so there is no-need to port the map library 218 and the function library 219.

In some embodiments, the method 300 may then be used to further the integration of the computing system 100, shown in FIG. 1, by converting the data in the data storage to some desired data model, or set of data models. In this embodiment, an application (not shown) methodically processes, for example, each document 118 including a first data model to the second data model of, for example, the document 115. To do this, for each document 118, the application:
- accesses the map library 218;
- retrieves the appropriate bi-directional data map 245;
- retrieves and executes any specified functions 248 from the function library 219;
- maps the data in the target document 118 info the data model of the source document 115;
- stores the target document 118 as mapped into the first data model; and
- deletes the target document in the second data model from the computing system 100.

Note that this process can be used to convert data sets into one or a plurality of data models, and on the fly or prior to use.

Returning now to FIG. 1, the illustrated embodiment does not convert data as described immediately above. As disclosed elsewhere, the source document 115 resides on the computing system 102 and the target document resides on the computing system 103, although the situs of the documents 102, 103 is not material to the practice of the invention. An application (not shown), residing on one of the workstations 106 is capable of reading the source document 115, but not the target document 118. To access the data of the target document 118, the application:
- accesses the map library 218;
- retrieves the appropriate bi-directional data map 245;
- retrieves and executes any specified functions 248 from the function library 219; and
- maps the data in the target document 118 into the data model of the source document 115.

Thus, the application can read the target document 118 without the target document 118 having previously been converted to the data model of the source document 115. If the This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method, in a data processing system having a processor and a data storage device, for mapping between at least two data models, comprising:
- selecting, by a user via a user interface of the data processing system, a source document in a computing system having a first data model having a first structure;
- selecting, by the user via the user interface, a target format or target document in a computing system having a second data model having a second structure;
- defining, by the user via the user interface, a relationship between the first data model and the second data model based on the first structure and the second structure, wherein the first structure and second structure are different;
- generating, by the processor of the data processing system, a bi-directional map between the first and second data models from at least portions of the source document, the target format or document, and the defined relationship, wherein the bi-directional map converts the content of a data store from the first data model to the second data model and converts the content of a data store from the second data model to the first data model; and storing the bi-directional map in the data storage device of the data processing system, wherein generating a bi-directional map between the first and second data models comprises:

assigning, to each data element in contents of the source document, a variable, thereby defining a first set of variables for the source document;

assigning, to each data element in the target format or target document, a variable, thereby defining a second set of variables for the source document;

receiving a first user input selecting a first subset of variables from the first set of variables;

receiving a second user input selecting a second subset of variables from the second set of variables to which the first subset of variables are to be mapped, wherein the first subset of variables and second subset of variables have different numbers of variables from each other;

performing a bi-directional interpolation between the first subset of variables and the second subset of variables based on the defined relationship;

generating a first map for mapping the first subset of variables to the second subset of variables based on results of the bi-directional interpolation; and generating a second map for mapping the second subset of variables to the first subset of variables based on results of the bi-directional interpolation.

2. The computer-implemented method of claim 1, wherein defining the relationship comprises defining at least one function operating on the first data model, the second data model, or both the first and second data models to yield a result in the second data model, the first data model, or both the second and first data models, respectively.

3. The computer-implemented method of claim 2, wherein the at least one defined function includes a concatenate function for conversion from the first data model to the second data model and a parse function for conversion from the second data model to the first data model.

4. The computer-implemented method of claim 3, wherein the first data model has a structure comprising three data elements comprising a 'FirstName' data element, a 'MiddleName' data element, and a 'LastName' data element; the second data model has a structure comprising one data element comprising a 'FullName' data element; and the bi-directional map both converts the FirstName' data element, the 'MiddleName' data element, and the 'LastName' data element to the 'FullName' data element and converts the 'FullName' data element to the 'FirstName' data element, the 'MiddleName' data element, and the 'LastName' data element.

5. The computer-implemented method of claim 2, wherein the at least one defined function comprises:

at least one function to transform data from a numeric data model to an ordinal data model and from the ordinal data model to the numeric data model; or at least one function to convert data from a first time zone data model to a second time zone data model and from the second time zone data model to the first time zone data model; or at least one function to convert data from a first date format data model to a second date format data model and from the second date format data model to the first date format data model, and wherein the at least one function is stored in a function library and invoked from the function library when converting the content of a data store from the first data model to the second data model and the content of a data store from the second data model to the first data model.

6. The computer-implemented method of claim 1, further comprising:

generating one or more additional bi-directional data maps, to yield a plurality of bi-directional data maps, each additional map mapping bi-directionally between two data models other than between the first data model and the second data model; and storing the generated bi-directional data maps in a map library, wherein the plurality of bi-directional maps converts the content of a data store from the first data model to the second data model or a third data model, converts the content of a data store from the second data model to the first data model or the third data model, and converts the content of a data store from the third data model to the first data model or the second data model.

7. A computing system, comprising:

a processor communicatively coupled to a memory, wherein the processor is adapted to:

receive a source selection for a source document in a computing system having a first data model having a first structure;

receive a target selection for a target format or for a target document in a computing system having a second data model having a second structure;

define a relationship between the structures of the first data model and the second data model, wherein the first structure and second structure are different; and generate a bi-directional map between the first data model and the second data model from at least portions of the source document, the target format or target document, and the defined relationship, wherein the bi-directional map converts the content of a data store from the first data model to the second data model and converts the content of a data store from the second data model to the first data model, wherein the bi-directional map is generated between the first and second data models by:

assigning, to each data element in contents of the source document, a variable, thereby defining a first set of variables for the source document;

assigning, to each data element in the target format or target document, a variable, thereby defining a second set of variables for the source document;

receiving a first user input selecting a first subset of variables from the first set of variables;

receiving a second user input selecting a second subset of variables from the second set of variables to which the first subset of variables are to be mapped, wherein the first subset of variables and second subset of variables have different numbers of variables from each other;

performing a bi-directional interpolation between the first subset of variables and the second subset of variables based on the defined relationship;

generating a first map for mapping the first subset of variables to the second subset of variables based on results of the bi-directional interpolation; and generating a second map for mapping the second subset of variables to the first subset of variables based on results of the bi-directional interpolation.

8. The computing system of claim 7, wherein the processor is adapted to define the relationship by actions comprising defining at least one function operating on the first data model, the second data model, or both the first and second data models to yield a result in the second data model, the first data model, or both the second and first data models, respectively.

9. The computing system of claim 8, wherein the at least one defined function includes a concatenate function for conversion from the first data model to the second data model and a parse function for conversion from the second data model to the first data model.

10. The computing system of claim 9, wherein the first data model has a structure comprising three data elements comprising a 'FirstName' data element, a 'MiddleName' data element, and a 'LastName' data element; the second data model has a structure comprising one data element comprising a 'FullName' data element; and the bi-directional map both converts the 'FirstName' data element, the 'MiddleName' data element, and the 'LastName' data element to the 'FullName' data element and converts the 'FullName' data element to the 'FirstName' data element, the 'MiddleName' data element, and the 'LastName' data element.

11. The computing system of claim 8, wherein the at least one defined function comprises:
at least one function to transform data from a numeric data model to an ordinal data model and from the ordinal data model to the numeric data model; or
at least one function to convert data from a first time zone data model to a second time zone data model and from the second time zone data model to the first time zone data model; or
at least one function to convert data from a first date format data model to a second date format data model and from the second date format data model to the first date format data model, and
wherein the processor is adapted to store the at least one function in a function library and invoke the at least one function from the function library when converting the content of a data store from the first data model to the second data model and the content of a data store from the second data model to the first data model.

12. The computing system of claim 7, wherein the processor is further adapted to:
generate one or more additional bi-directional data maps, to yield a plurality of bi-directional data maps, each additional map mapping bi-directionally between two data models other than between the first data model and the second data model; and
store the generated bi-directional data maps in a map library,
wherein the plurality of bi-directional maps converts the content of a data store from the first data model to the second data model or a third data model, converts the content of a data store from the second data model to the first data model or the third data model, and converts the content of a data store from the third data model to the first data model or the second data model.

13. The computing system of claim 7, wherein the processor is further adapted to:
generate one or more additional bi-directional data maps, to yield a plurality of bi-directional data maps, each additional map mapping bi-directionally between two data models other than between the first data model and the second data model;
and
store the generated bi-directional data maps in a map library,
wherein the plurality of bi-directional maps converts the content of a data store from the first data model to the second data model or a third data model, converts the content of a data store from the second data model to the first data model or the third data model, and converts the content of a data store form the third data model to the first data model or the second data model;
wherein the processor is adapted to define the relationship by actions comprising defining at least one function operating on at least one data model to yield a result in at least one other data model;
wherein the processor is adapted to generate the plurality of bi-directional maps by actions comprising generating from at least portions of the source document, the target format or document, and the at least one defined function; and
wherein the processor is adapted to store the at least one function in a function library and invoke the at least one function from the function library when converting the content of a data store from the first data model to the second data model and the content of a data store from the second data model to the first data model.

14. A program storage medium encoded with instructions that, when executed by a computing apparatus, perform a method for mapping between data models, the method comprising:
receiving a source selection, for a source document in the program storage medium having a first data model having a first structure;
receiving a target selection for a target format or for a target document in the program storage medium having a second data model having a second structure;
defining a relationship between the structures of the first data model and the second data model; and
generating a bi-directional map between the first data model and the second data model from at least portions of the source document, the target format or target document, and the defined relationship, wherein the bi-directional map converts the content of a data store from the first data model to the second data model and converts the content of a data store from the second data model to the first data model, wherein the bi-directional map is generated between the first and second data models by:
assigning, to each data element in contents of the source document, a variable, thereby defining a first set of variables for the source document;
assigning, to each data element in the target format or target document, a variable, thereby defining a second set of variables for the source document;
receiving a first user input selecting a first subset of variables from the first set of variables;
receiving a second user input selecting a second subset of variables from the second set of variables to which the first subset of variables are to be mapped, wherein the first subset of variables and second subset of variables have different numbers of variables from each other;
performing a bi-directional interpolation between the first subset of variables and the second subset of variables based on the defined relationship;
generating a first map for mapping the first subset of variables to the second subset of variables based on results of the bi-directional interpolation; and
generating a second map for mapping the second subset of variables to the first subset of variables based on results of the bi-directional interpolation.

15. The program storage medium of claim 14, wherein defining the relationship comprises defining at least one function operating on the first data model, the second data model, or both the first and second data models to yield a result in the second data model, the first data model, or both the second and first data models, respectively.

16. The program storage medium of claim 15, wherein the at least one defined function includes a concatenate function for conversion from the first data model to the second data model and a parse function for conversion from the second data model to the first data model.

17. The program storage medium of claim 16, wherein the first data model has a structure comprising three data elements comprising a 'FirstName' data element, a 'MiddleName' data element, and a 'LastName' data element; the second data model has a structure comprising one data element comprising a 'FullName' data element; and the bi-directional map both converts the 'FirstName' data element, the 'MiddleName' data element, and the 'LastName' data element to the 'FullName' data element and converts the 'FullName' data element to the 'FirstName' data element, the 'MiddleName' data element, and the 'LastName' data element.

18. The program storage medium of claim 15, wherein the at least one defined function comprises:
   at least one function to transform data from a numeric data model to an ordinal data model and from the ordinal data model to the numeric data model; or
   at least one function to convert data from a first time zone data model to a second time zone data model and from the second time zone data model to the first time zone data model; or
   at least one function to convert data from a first date format data model to a second date format data model and from the second date format data model to the first date format data model, and
   wherein the at least one function in a function library and invoked from the function library when converting the content of a data store from the first data model to the second data model and the content of a data store from the second data model to the first data model.

19. A computer-implemented method, in a data processing system comprising a processor and a hardware data storage device, of converting the content of the hardware data storage device from a first data model to a second data model, the method comprising:
   storing, in the hardware data storage device, a bi-directional data map, the bi-directional map being generated between the first and second data models from at least portions of a source document, a target format or document, and a defined relationship between the source document and the target format or document;
   mapping, by the processor, data in a target format or target document including the second data model into the first data model of a source, and
   converting, by the processor, both the content of a data store from the first data model to the second data model using the bi-directional map and the content of a data store from the second data model to the first data model using the bi-directional map, wherein the bi-directional map is generated between the first and second data models by:
      assigning, to each data element in contents of the source document, a variable, thereby defining a first set of variables for the source document;
      assigning, to each data element in the target format or target document, a variable, thereby defining a second set of variables for the source document;
      receiving a first user input selecting a first subset of variables from the first set of variables;
      receiving a second user input selecting a second subset of variables from the second set of variables to which the first subset of variables are to be mapped, wherein the first subset of variables and second subset of variables have different numbers of variables from each other;
      performing a bi-directional interpolation between the first subset of variables and the second subset of variables based on the defined relationship;
      generating a first map for mapping the first subset of variables to the second subset of variables based on results of the bi-directional interpolation; and
      generating a second map for mapping the second subset of variables to the first subset of variables based on results of the bi-directional interpolation.

20. The computer-implemented method of claim 19, wherein the defined relationship is defined by defining at least one function operating on the first data model, the second data model, or both the first and second data models to yield a result in the second data model, the first data model, or both the second and first data models, respectively.

21. The computer-implemented method of claim 20, wherein the at least one defined function includes a concatenate function for conversion from the first data model to the second data model and a parse function for conversion from the second data model to the first data model.

22. The computer-implemented method of claim 21, wherein the first data model has a structure comprising three data elements comprising a 'FirstName' data element, a 'MiddleName' data element, and a 'LastName' data element; the second data model has a structure comprising one data element comprising a 'FullName' data element; and the bi-directional map both converts the 'FirstName' data element, the 'MiddleName' data element, and the 'LastName' data element to the 'FullName' data element and converts the 'FullName' data element to the 'FirstName' data element, the 'MiddleName' data element, and the 'LastName' data element.

23. The computer-implemented method of claim 20, wherein the at least one defined function comprises:
   at least one function to transform data from a numeric data model to an ordinal data model and from the ordinal data model to the numeric data model; or
   at least one function to convert data from a first time zone data model to a second time zone data model and from the second time zone data model to the first time zone data model; or
   at least one function to convert data from a first date format data model to a second date format data model and from the second date format data model to the first date format data model, and
   wherein the at least one function in a function library and invoked from the function library when converting the content of a data store from the first data model to the second data model and the content of a data store from the second data model to the first data model.

24. A computer-implemented method of mapping between at least two data models, comprising:
   defining a relationship between the first data model for a first source document and a second data model for a target format, including:
      receiving a user-specified target format; or
      in the absence of the user-specified target format, defaulting to a predetermined target format;
   generating a bi-directional map between the first data model and the second data model from at least portions of the source document, the target format, and the defined relationship;

storing the bi-directional map; and converting the content of a data store from the first data model to the second data model and converting the content of a data store from the second data model to the first data model, wherein the bi-directional map is generated between the first and second data models by:

assigning, to each data element in contents of the source document, a variable, thereby defining a first set of variables for the source document;

assigning, to each data element in the target format, a variable, thereby defining a second set of variables for the source document;

receiving a first user input selecting a first subset of variables from the first set of variables;

receiving a second user input selecting a second subset of variables from the second set of variables to which the first subset of variables are to be mapped, wherein the first subset of variables and second subset of variables have different numbers of variables from each other;

performing a bi-directional interpolation between the first subset of variables and the second subset of variables based on the defined relationship;

generating a first map for mapping the first subset of variables to the second subset of variables based on results of the bi-directional interpolation; and generating a second map for mapping the second subset of variables to the first subset of variables based on results of the bi-directional interpolation.

25. The computer implemented method of claim 1, wherein receiving a first user input selecting a first subset of variables from the first set of variables comprises receiving a user selection of a representation of a subset of data elements from the source document, corresponding to the first subset of variables, via the user interface.

26. The computer implemented method of claim 25, wherein receiving a second user input selecting a second subset of variables from the second set of variables comprises detecting a user operation to drag the representation of the selected subset of data elements to a representation of one or more data elements of the target format or target document corresponding to the second subset of variables, via the user interface.

27. The computer implemented method of claim 25, wherein receiving a first user input selecting a first subset of variables from the first set of variables comprises receiving a user selection of a representation of a subset of data elements from the source document, corresponding to the first subset of variables, via the user interface, and wherein receiving a second user input selecting a second subset of variables from the second set of variables comprises receiving a user selection of a function, from a function library, and one or more target elements of the target format or target document.

* * * * *